United States Patent
Wu

(10) Patent No.: US 8,456,788 B2
(45) Date of Patent: Jun. 4, 2013

(54) PROTECTION SYSTEM FOR SERVER

(75) Inventor: Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 34 days.

(21) Appl. No.: 13/300,611

(22) Filed: Nov. 20, 2011

(65) Prior Publication Data

US 2013/0044399 A1 Feb. 21, 2013

(30) Foreign Application Priority Data

Aug. 17, 2011 (CN) .......................... 2011 1 0236001

(51) Int. Cl.
*H02H 5/04* (2006.01)
*H01H 35/00* (2006.01)

(52) U.S. Cl.
USPC .......................................... 361/93.8; 307/116

(58) Field of Classification Search
USPC .......................................... 361/93.8; 307/116
See application file for complete search history.

(56) References Cited

U.S. PATENT DOCUMENTS

| | | | | |
|---|---|---|---|---|
| 6,000,040 A | * | 12/1999 | Culley et al. | 714/31 |
| 6,032,271 A | * | 2/2000 | Goodrum et al. | 714/56 |
| 6,268,664 B1 | * | 7/2001 | Rolls et al. | 307/32 |
| 6,392,372 B1 | * | 5/2002 | Mays, II | 318/400.01 |
| 6,421,215 B1 | * | 7/2002 | Bushue | 361/93.1 |
| 6,592,449 B2 | * | 7/2003 | Cipolla et al. | 454/184 |
| 6,750,562 B2 | * | 6/2004 | Rolls et al. | 307/32 |
| 6,829,141 B2 | * | 12/2004 | Garnett et al. | 361/679.48 |
| 7,375,486 B2 | * | 5/2008 | Ku et al. | 318/599 |
| 7,966,837 B2 | * | 6/2011 | El-Galley et al. | 62/186 |
| 2002/0063476 A1 | * | 5/2002 | Rolls et al. | 307/117 |
| 2002/0121555 A1 | * | 9/2002 | Cipolla et al. | 236/49.1 |

* cited by examiner

*Primary Examiner* — Ronald W Leja
(74) *Attorney, Agent, or Firm* — Altis Law Group, Inc.

(57) ABSTRACT

A protection system includes a baseboard management controller (BMC), N fans, a power on unit, a power supply, and a switching unit. The switching unit includes an AND gate, a transistor, and a first resistor. During operation the fans each output an operating signal to the BMC. The BMC counts the operating signals received. When the count is less than N, the power-off pin outputs a low level signal, so that the output pin of the AND gate outputs a low level signal, and the transistor turns off. The power supply then receives a high level signal and stops supplying power.

3 Claims, 1 Drawing Sheet

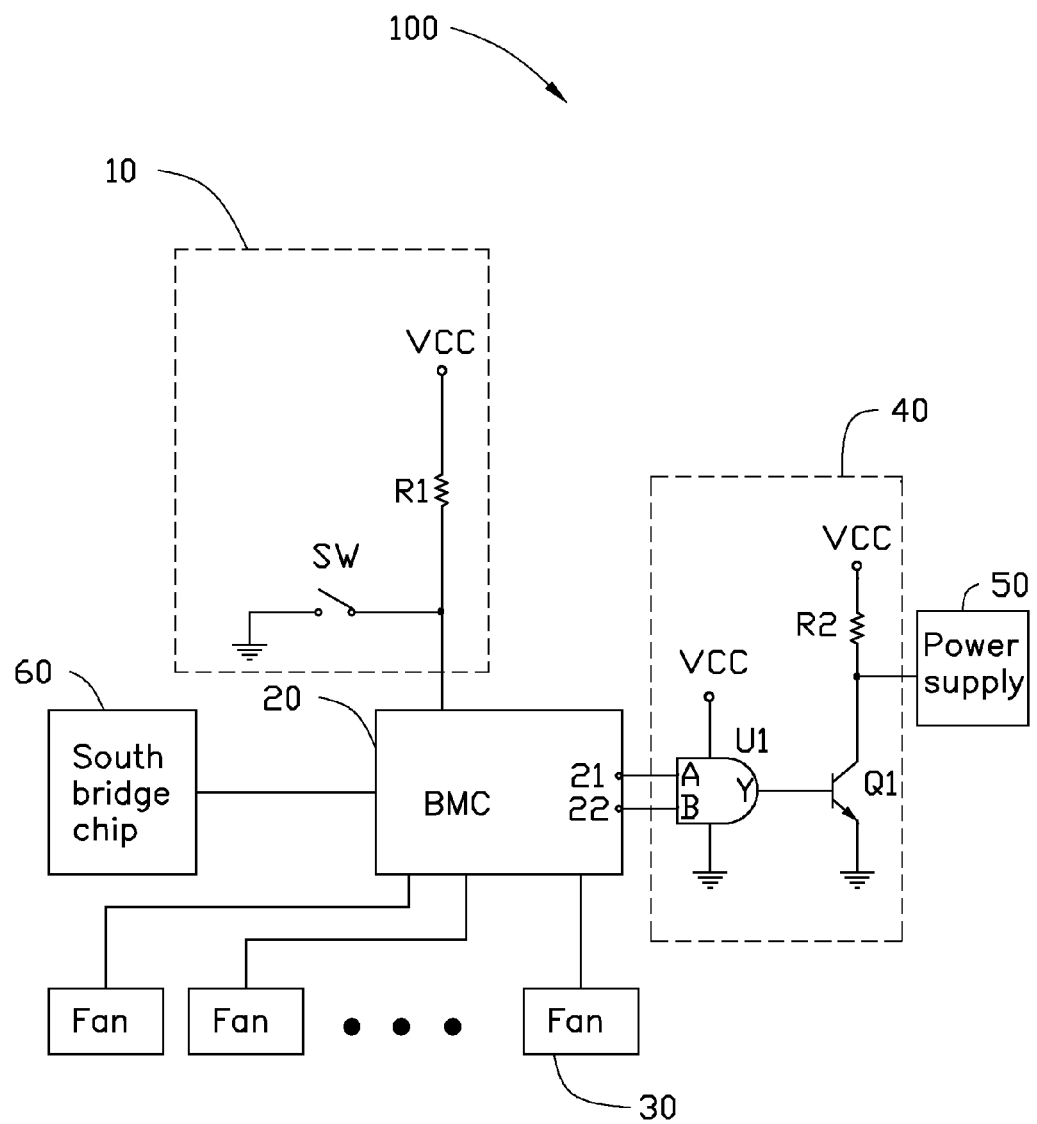

PROTECTION SYSTEM FOR SERVER

BACKGROUND

1. Technical Field

The present disclosure relates to a protection system for servers.

2. Description of Related Art

In a server, there are a plurality of fans mounted adjacent to corresponding elements, such as central processing units (CPUs), and hard disk drives. If one of the fans should breakdown, nearby elements may overheat and possibly damage the server.

BRIEF DESCRIPTION OF THE DRAWING

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

The Figure is a circuit diagram of an exemplary embodiment of a protection circuit.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Referring to the figure, an exemplary embodiment of a protection system for a server includes a baseboard management controller (BMC) 20, a south bridge chip 60, N number of fans 30, a power-on unit 10, a switching unit 40, and a power supply 50. The south bridge chip 60 is connected to the BMC 20. The switching unit 40 is connected to the power supply 50. The power supply 50 supplies power to the server. The BMC 20 includes a power-on pin 21 and a power-off pin 22. In the embodiment, N is an integer greater than two.

The power-on unit 10 includes a resistor R1 and a switch SW. A first terminal of the resistor R1 is connected to a direct current (DC) power source VCC. A second terminal of the resistor R1 is connected to a first terminal of the switch SW and the BMC 20. A second terminal of the switch SW is grounded.

The fans 30 are connected to the BMC 20. The BMC 20 receives an operating signal from each working fan 30. When one or more of the fans 30 does not work, the one or more fans will not output an operating signal.

The switching unit 40 includes an AND gate U1, a transistor Q1, and a resistor R2. A first input pin A of the AND gate U1 is connected to the power-on pin 21. A second input pin B of the AND gate U1 is connected to the power-off pin 22. An output pin Y of the AND gate U1 is connected to a base of the transistor Q1. An emitter of the transistor Q1 is grounded. A collector of the transistor Q1 is connected to the DC power source VCC through the resistor R2. The collector of the transistor Q1 is further connected to the power supply 50.

When the switch SW of the power-on unit 10 is turned on, the BMC 20 receives a low level signal. At this time, the BMC 20 transmits the low level signal to the south bridge chip 60. The south bridge chip 60 outputs a feedback signal to the BMC 20. The power-on pin 21 and the power-off pin 22 output high level signals. As a result, the output pin Y outputs a high level signal, and the transistor Q1 is turned on so that the power supply 50 receives a low level signal and supplies power to the server.

During startup of the server, the BMC 20 counts the number of operating signals received from the fans 30. If the count equals N, namely all fans 30 are working, the power-on pin 21 and the power-off pin 22 output high level signals. The power supply 50 keeps on supplying power to the server. If the count is less than N, namely at least one fan 30 does not work, the power-off pin 22 outputs a low level signal to turn off the transistor Q1. At this time, the power supply 50 receives a high level signal to stop supplying power to the server.

During operation of the server, the power-on pin 21 and the power-off pin 22 output high level signals. The BMC 20 regularly counts the number of operating signals from the fans 30 to compare with N. As long as the count equals N, the power-on pin 21 and the power-off pin 22 output high level signals to make the power supply 50 maintain power to the server. If at any time the count is less than N, namely at least one fan 30 ceases working, the power-off pin 22 outputs a low level signal, and the output pin Y outputs a low level signal to turn off the transistor Q1. At this time, the power supply 50 receives a high level signal and stops supplying power to the server.

In other embodiments, the BMC can be configured to allow the power supply 50 to supply power for other conditions such as the count being equal to or greater than (N−1) when it is determined that it will not be critical if a certain number of fans are not working during server operation.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A protection system comprising:
    a baseboard management controller (BMC) comprising a power-on pin and a power-off pin;
    N number of fans, wherein N is an integer greater than two;
    a power on unit;
    a power supply; and
    a switching unit comprising an AND gate, a transistor, and a first resistor, wherein a first input pin of the AND gate is connected to the power-on pin, a second input pin of the AND gate is connected to the power-off pin, an output pin of the AND gate is connected to a base of the transistor, an emitter of the transistor is grounded, a collector of the transistor is connected to a direct current (DC) power source through the first resistor, the collector of the transistor is further connected to the power supply; wherein during operation the N fans each outputs an operation signal to the BMC, the BMC counts a number of operating signals received from the N fans, when the count is less than N, the power-off pin outputs a low level signal, so that the output pin of the AND gate outputs a low level signal to turn off the transistor, the power supply receives a high level signal and stops supplying power.

2. The protection system of claim 1, wherein when the count equals N, the power-off pin and the power-on pin outputs high level signals, so that the output pin of the AND gate outputs a high level signal to turn on the transistor, the power supply receives a low level signal and keeps on supplying power.

3. The protection system of claim 1, wherein the power on unit comprises a second resistor and a switch, a first terminal of the second resistor is connected to the DC power source, a second terminal of the second resistor is connected to the BMC and a first terminal of the switch, a second terminal of the switch is grounded.

* * * * *